(No Model.)

W. KEARNEY
EGG HOLDER.

No. 295,648. Patented Mar. 25, 1884.

WITNESSES:
Gustave Dieterich
John C. Tunbridge

INVENTOR
Wm. Kearney
BY Briesen & Steele
ATTORNEYS

N. PETERS, Photo-Lithographer, Washington, D. C.

United States Patent Office.

WILLIAM KEARNEY, OF FRANKLIN, NEW JERSEY.

EGG-HOLDER.

SPECIFICATION forming part of Letters Patent No. 295,648, dated March 25, 1884.

Application filed January 5, 1884. (No model.)

*To all whom it may concern:*

Be it known that I, WILLIAM KEARNEY, a resident of Franklin, in the county of Essex and State of New Jersey, have invented an Improved Egg-Holder, of which the following is a full, clear, and exact description, reference being made to the accompanying drawings, in which—

Figure 1:
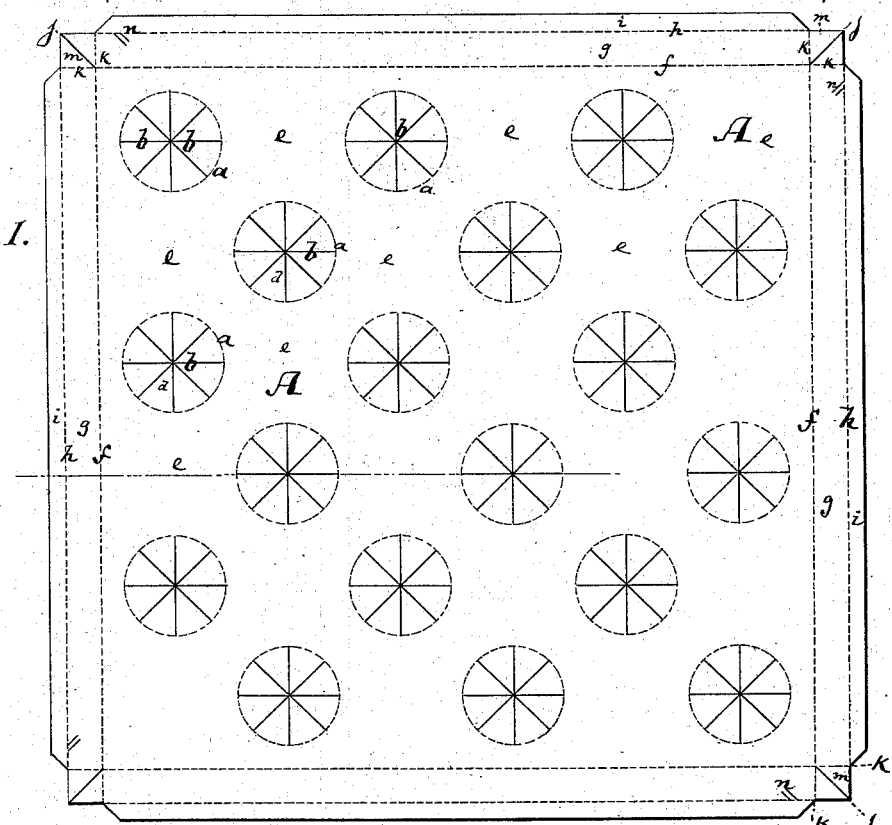
Figure 2:
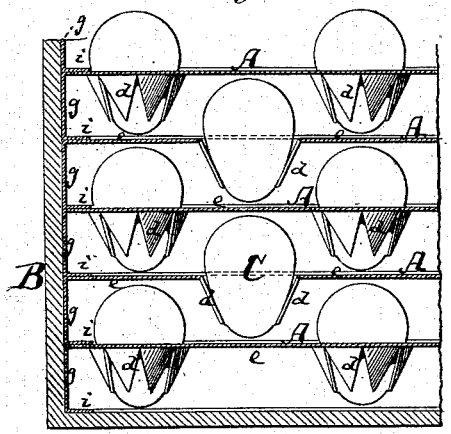
Figure 3:
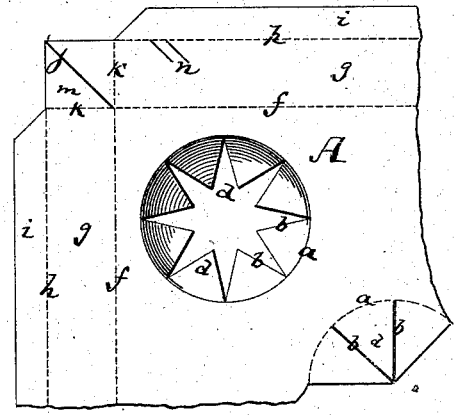

Figure 1 represents a top view of my improved egg-holder. Fig. 2 is a vertical section through the same; Fig. 3, an enlarged top view of one corner of it, and Fig. 4 a perspective view of one of its angles when in position for use.

This invention relates to a support for eggs, it being intended as a means for sustaining eggs properly spaced and separated in large boxes or cases in which they are shipped to market.

My invention consists in forming the egg-holder for each layer of eggs of one single sheet of pasteboard or the like, which sheet is adapted to have its edges turned down and perforated to receive the eggs, and provided with guards to protect the sides of the eggs, all as hereinafter more fully described, and pointed out in the claims.

In the drawings, Figure 1 shows the outline of the sheet of pasteboard, which is shaped according to my invention, illustrating one form of it. The dotted lines in that figure indicate creases on which the pasteboard can be folded. The full lines within this sheet (shown in Fig. 1) indicate incisions. The middle portion of the board A here shown has circular or polygonal openings formed in it at proper distances apart, which openings are produced by creases $a$, of circular or polygonal form, and by incisions $b$ within these creases. These incisions are radial, as shown, and produce series of pointed projections $d$, (see Fig. 3,) which can be turned down, as in Fig. 2, to serve the purpose of shielding the eggs at their sides, the apertures that are formed by the creases $a$ and incisions $b$ being of a size to receive an egg in each. The circular or polygonal creases $a\ a$ are so arranged in the sheet A, either in rows or otherwise, as to leave between them blank spaces $e$, that are fully as large as the openings formed by the creases $a$ and incisions $b$. This allows me to use in one box or case a series of superposed sheets, A, in which the openings for the reception of the eggs alternate, so that the egg C, for instance, which is shown in Fig. 2, rests on the blank space $e$ in the egg-holder beneath it, or is, at least, adapted to rest on that blank space, should the aperture through which the egg is inserted be small enough to allow it to reach contact with the sheet A below.

The egg-holder as far as described will be fully operated as a flat sheet, if the shipper chooses to space the several egg-holders or sheets A A by suitable frames, which he interposes between them. Yet such frames would add to the expense, and are made needless by a further portion of my invention, which concerns the margin or border of the sheet A—that is to say, on creases $f$, which run parallel with the edges of the sheet, these edges can be turned down into vertical portions $g$, and these vertical portions $g$ may, if further creases $h$ are provided, be turned in at their lower parts to form flanges $i$, as in Fig. 2. This will furnish a support for each sheet A, and a proper spacing for holding several sheets in the box B the requisite distances apart. By slitting the corners of the sheet by diagonal incisions $j$ and forming rectangular creases $k$ I am further enabled to lock the vertical walls $g$ in their vertical position as soon as I tuck one of the triangular lapels $m$ that are thus formed at the corner into slits $n$, which are formed in the contiguous vertical portion $g$ for its reception.

Figure 4:
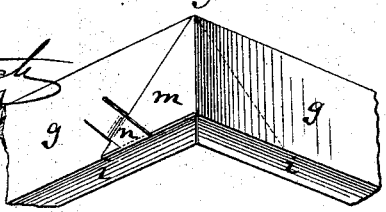

Fig. 4 shows the lapel tucked in, as described, and shows also one corner of the sheet when the parts $g$ and $i$ have been formed by folding in the manner described. I propose to ship these sheets A in their flat condition—that is, as they are represented in Fig. 1—to the party who desires to pack the eggs, and it will be seen that there is no room wasted in any package containing a given quantity of these flat sheets. The shipper now folds the sheets by turning down the edges $g$ and $i$ and locking the corners, and sets them into his boxes B, placing the eggs into each layer that is received within the box, and taking care only to break joints, so that one egg will not be in the way of the other.

Although I have described the best means for forming the vertical supports for the sheets A, I do not wish to confine myself thereto; nor do I desire to limit myself to the particular means described of locking the corners, as other means may be utilized for that purpose without doing away with the remaining important features of my invention.

I claim—

1. The egg-holder A, constructed with the creases $a$, and with the incisions $b$, that are embraced by said creases, and adapted to form the wings $d$, substantially as described.

2. The egg-holder A, having apertures for the reception of the eggs, and provided with creases $f$, by which it is adapted to have the edges $g$ turned down as specified.

3. The egg-holder A, having creases $f$ and $h$, adapted to form the vertical walls $g$, and lower flanges, $i$, substantially as described.

4. The egg-holder A, having vertical walls $g$, and provided with corner-lapels $m$ and incisions or slits $n$, substantially as and for the purpose herein shown and described.

WILLIAM KEARNEY.

Witnesses:
GUSTAV SCHNEPPÉ,
WILLY G. E. SCHULTZ.